United States Patent
Nada et al.

(10) Patent No.: US 9,070,025 B2
(45) Date of Patent: Jun. 30, 2015

(54) BIOMETRIC INFORMATION PROCESSING APPARATUS, BIOMETRIC INFORMATION PROCESSING METHOD

(71) Applicant: FUJITSU LIMITED, Kawasaki-shi, Kanagawa (JP)

(72) Inventors: Hajime Nada, Kawasaki (JP); Shigefumi Yamada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 13/845,303

(22) Filed: Mar. 18, 2013

(65) Prior Publication Data

US 2013/0251213 A1    Sep. 26, 2013

(30) Foreign Application Priority Data

Mar. 23, 2012   (JP) .................. 2012-068093

(51) Int. Cl.
*G06K 9/00*   (2006.01)
*G06K 9/68*   (2006.01)

(52) U.S. Cl.
CPC ........ *G06K 9/00892* (2013.01); *G06K 9/00006* (2013.01)

(58) Field of Classification Search
None
See application file for complete search history.

(56) References Cited

U.S. PATENT DOCUMENTS

2008/0253619 A1\*  10/2008  Hagino et al. ................ 382/115
2009/0110249 A1\*  4/2009   Miura et al. .................. 382/124
2009/0232367 A1   9/2009   Shinzaki

FOREIGN PATENT DOCUMENTS

JP    2003-281508    10/2003
WO   WO 2005/069212  7/2005

OTHER PUBLICATIONS

Muto (Computer English-Translation of Japanese Patent No. JP-2003-281508), pp. 1-5.\*

\* cited by examiner

*Primary Examiner* — Daniel Mariam
(74) *Attorney, Agent, or Firm* — Staas & Halsey LLP

(57) ABSTRACT

A biometric information processing apparatus includes a biometric sensor configured to acquire biometric information of a first instance, a second instance and a third instance; a processor configured to execute a procedure, the procedure comprising: extracting an authentication feature used for matching from the biometric information of each of the second instance and the third instance; normalizing the relative positions of authentication features of the second instance and the third instance by using the biometric information of the first instance; and extracting a relative feature indicating a relative positional relationship between the authentication features of the second instance and the third instance normalized in the normalizing procedure.

19 Claims, 23 Drawing Sheets

■ : MINUTIAE OF FINGERPRINT (BIFURCATION POINT)
▲ : MINUTIAE OF FINGERPRINT (ENDPOINT)
★ : CENTRAL POINT OF FINGERPRINT
→ : COORDINATE AXIS
( ) : APPROXIMATE RANGE OF FINGERPRINT

FIG. 11

| | COORDINATE SYSTEM USING POSITION OF CENTRAL POINT OF FINGERPRINT OF INDEX FINGER AS REFERENCE POINT | COORDINATE SYSTEM USING POSITION OF CENTRAL POINT OF FINGERPRINT OF MIDDLE FINGER AS REFERENCE POINT | COORDINATE SYSTEM USING POSITION OF CENTRAL POINT OF FINGERPRINT OF RING FINGER AS REFERENCE POINT |
|---|---|---|---|
| RELATIVE FEATURE OF USER A — COORDINATES OF MINUTIAE OF INDEX FINGER | | $(X11', Y11')$ $(X12', Y12')$ ... | $(X11'', Y11'')$ $(X12'', Y12'')$ ... |
| COORDINATES OF MINUTIAE OF MIDDLE FINGER | $(X21, Y21)$ $(X22, Y22)$ ... | | $(X21'', Y21'')$ $(X22'', Y22'')$ ... |
| COORDINATES OF MINUTIAE OF RING FINGER | $(X31, Y31)$ $(X32, Y32)$ ... | $(X31', Y31')$ $(X32', Y32')$ ... | |

■ : MINUTIAE OF FINGERPRINT (BIFURCATION POINT)
▲ : MINUTIAE OF FINGERPRINT (END POINT)
★ : CENTRAL POINT OF FINGERPRINT
→ : COORDINATE AXIS
( ) : APPROXIMATE RANGE OF FINGERPRINT

FIG. 22

| | COORDINATE SYSTEM USING POSITION OF CENTRAL POINT OF FINGERPRINT OF INDEX FINGER AS REFERENCE POINT | COORDINATE SYSTEM USING POSITION OF CENTRAL POINT OF FINGERPRINT OF MIDDLE FINGER AS REFERENCE POINT | COORDINATE SYSTEM USING POSITION OF CENTRAL POINT OF FINGERPRINT OF RING FINGER AS REFERENCE POINT |
|---|---|---|---|
| COORDINATES OF MINUTIAE OF INDEX FINGER | | (X11',Y11')<br>(X12',Y12')<br>... | (X11",Y11")<br>(X12",Y12")<br>... |
| COORDINATES OF MINUTIAE OF MIDDLE FINGER | (X21,Y21)<br>(X22,Y22)<br>... | | (X21",Y21")<br>(X22",Y22")<br>... |
| COORDINATES OF MINUTIAE OF RING FINGER | (X31,Y31)<br>(X32,Y32)<br>... | (X31',Y31')<br>(X32',Y32')<br>... | |
| COORDINATES OF BIFURCATION AND THE LIKE OF INDEX FINGER VEIN (RELATIVE FEATURE OF USER A) | (X51,Y51)<br>(X52,Y52)<br>... | (X41',Y41')<br>(X42',Y42')<br>... | (X41",Y41")<br>(X42",Y42")<br>... |
| COORDINATES OF BIFURCATION AND THE LIKE OF MIDDLE FINGER VEIN | (X51,Y51)<br>(X52,Y52)<br>... | | (X51",Y51")<br>(X52",Y52")<br>... |
| COORDINATES OF BIFURCATION AND THE LIKE OF RING FINGER VEIN | (X61,Y61)<br>(X62,Y62)<br>... | (X61',Y61')<br>(X62',Y62')<br>... | |

BIOMETRIC INFORMATION PROCESSING APPARATUS, BIOMETRIC INFORMATION PROCESSING METHOD

CROSS-REFERENCE TO RELATED APPLICATIONS

This application is based upon and claims the benefit of priority of the prior Japanese Patent Application No. 2012-068093, filed on Mar. 23, 2012, the entire contents of which are incorporated herein by reference.

FIELD

The present disclosure relates to a biometric information processing apparatus, a biometric information processing method and a computer-readable recording medium storing a biometric information processing program.

BACKGROUND

Recently, the number of users for a single system that uses biometric authentication continues to increase. In order to suppress erroneous authentication despite the increasing number of users for a single system, improved performance for discrimination of an individual is desired. For example, International Publication Pamphlet No. WO 2005/069212 discloses the use in authentication of the positional relationship between fingerprints of several fingers. In addition, Japanese Laid-open Patent Publication No. 2003-281508 discloses an apparatus equipped with a plurality of fingerprint sensors, wherein the positional relationship between the directions of fingertips of the centers of the fingerprints of several fingers are used in authentication.

However, with the information used that is disclosed in International Publication Pamphlet No. WO 2005/069212 and Japanese Laid-open Patent Publication No. 2003-281508, it is difficult to shorten the time required for authentication.

SUMMARY

According to an aspect of the invention, a biometric information processing apparatus includes a first aspect of the present disclosure, there is provided a biometric information processing apparatus that includes: a biometric sensor that acquires biometric information of a first instance, a second instance and a third instance; an authentication feature extraction unit that extracts an authentication feature for matching based on the biometric information of each of the second instance and the third instance; a normalization unit that normalizes the relative position between the authentication features of the second instance and the third instance by using the biometric information of the first instance; and a relative feature extraction unit that extracts a relative feature indicating a relative positional relationship between the authentication features of the second instance and the third instance normalized by the normalization unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 11 is a view illustrating an example of a data structure of relative features calculated using the position of the center of a fingerprint of each of index finger, middle finger and ring finger as the origin.

FIG. 22 is a view illustrating an example of a data structure for relative features.

DESCRIPTION OF EMBODIMENTS

First, the terms used in the following embodiments will be described. An instance refers to a unit of a living body used in authentication, such as for example, a finger, a palm, a face or an eye. Accordingly, a finger and a palm are different instances. Furthermore, a middle finger and an index finger are also different instances, and a right eye and a left eye are also different instances. Modality refers to the type of a biometric feature, such as for example, a fingerprint, a vein, an iris, a face shape, or a palm shape. Accordingly, the fingerprint and the vein for the same finger are different modalities.

Biometric information refers to information of a body and includes, for example, a biometric feature representing a biometric characteristic of an individual body. An authentication feature is data extracted independently from each biometric feature and used in a matching process for authentication. For example, the authentication feature includes a pattern of a fingerprint image, a positional relationship between minutiae of fingerprints, or a pattern of a palm vein image. Alternatively, the authentication feature may also include features used to narrow candidates for matching. For example, the authentication feature may also include a fingerprint pattern along with the pattern of a fingerprint image, which are used to narrow candidates for matching by using fingerprint pattern classifications.

A relative feature is information indicating a relative positional relationship between the authentication features of different instances. The relative feature is, for example, a distance between the right eye and the left eye, the coordinate value of the position of the center of a fingerprint, and minutiae of a fingerprint of a finger, when the position of the center of the fingerprint of any one of other fingers is used as a reference point. Furthermore, when the biometric information of the fingertip is finger veins, the relative feature may be, for example, a relative coordinate value of an intersection point, an endpoint, or a bifurcation point of two finger veins. Furthermore, the authentication features of other modalities may be the subject of the relative feature. For example, when the position of the center of the fingerprint of a finger is used as a reference point, the relative feature may be, for example, the intersection point, the endpoint or the bifurcation point of the veins of another finger.

Hereinafter, embodiments of the present disclosure will be described with reference to the accompanying drawings.

Figure 1A:
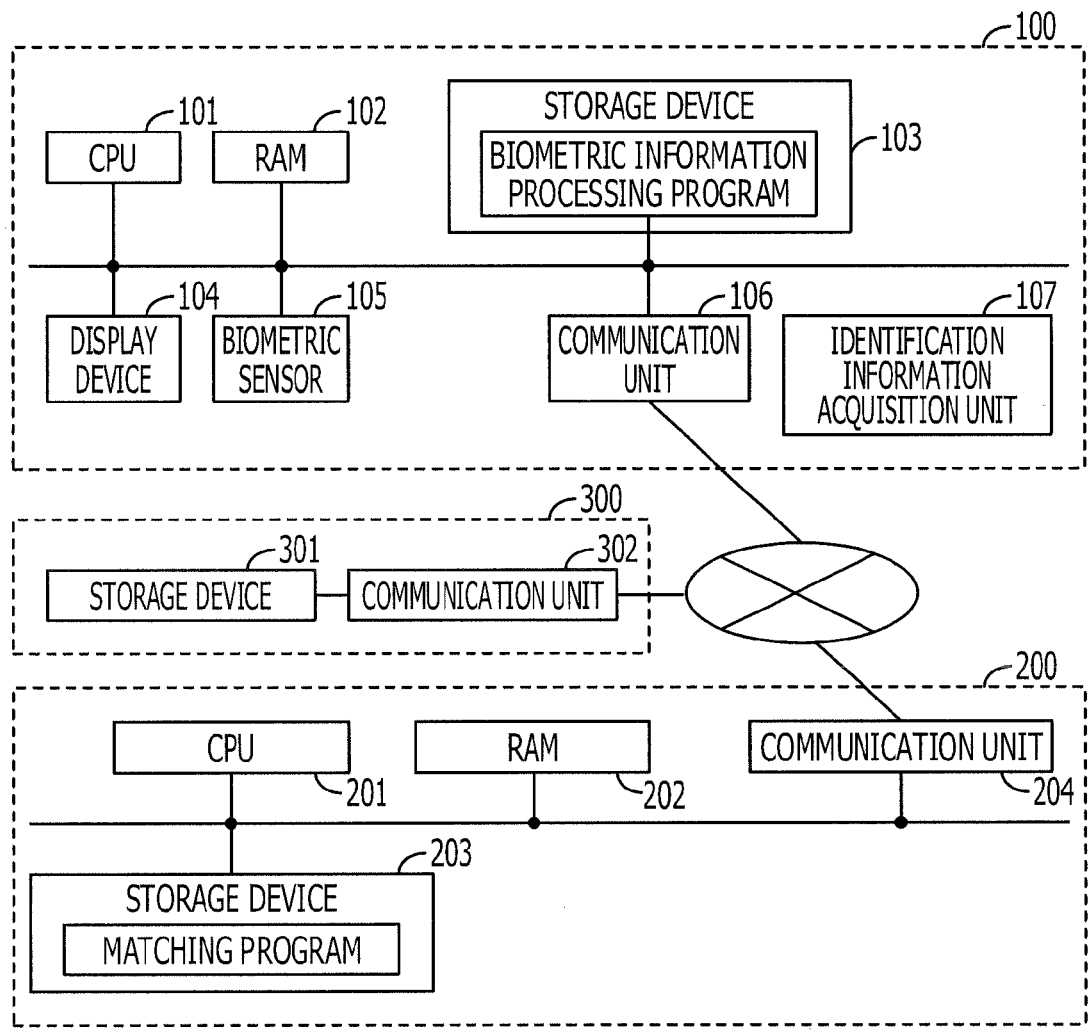
FIG. 1A is a block diagram for describing a hardware configuration of a biometric information processing apparatus according to a first exemplary embodiment.
Figure 1B:
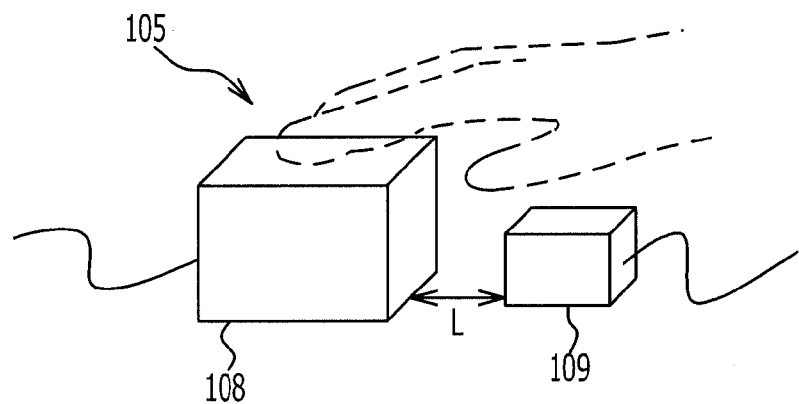
FIG. 1B is a schematic diagram of a biometric sensor of the present disclosure.

FIG. 1A is a block diagram for describing the hardware configuration of a biometric information processing apparatus 100 according to a first exemplary embodiment. FIG. 1B is a schematic diagram of a biometric sensor that is to be described below. Referring to FIG. 1A, the biometric information processing apparatus 100 includes, for example, a central processing unit (CPU) 101, a random access memory (RAM) 102, a storage device 103, a display device 104, a biometric sensor 105, a communication unit 106, and an identification information acquiring unit 107. Each of these components is connected with each other by, for example, a data bus. Furthermore, the biometric information processing apparatus 100 is connected to an authentication server 200 and a database server 300 through a network.

The CPU 101 includes one or more cores. The RAM 102 is a volatile memory which temporarily stores, for example, a program executed by the CPU 101 or data processed by the CPU 101.

The storage device 103 is a non-volatile storage device. As for the storage device 103, a read only memory (ROM), a solid state drive (SSD) such as a flash memory, a hard disk driven by a hard disk drive or so on may be used. A biometric information processing program according to the present embodiment is stored in the storage device 103. The display device 104 is, for example, a liquid crystal display or an electroluminescence panel, and displays, for example, the results of biometric information processing.

The biometric sensor 105 is a sensor that detects biometric information of a user, takes at least three different instances as a subject to be detected, and acquires the same or different modalities. In the present embodiment, the biometric sensor 105 acquires a palm image as palm information while also acquiring fingerprint images of a plurality of fingers as fingertip information. That is, the biometric sensor 105 takes different instances such as a plurality of fingers and a palm as a subject, and acquires different modalities, such as the fingerprint and the veins.

Referring to FIG. 1B, the biometric sensor 105 is equipped with a fingertip information acquisition unit 108 and a palm information acquisition unit 109. The fingertip information acquisition unit 108 is, for example, an optical sensor or a capacitive sensor, and acquires fingerprint images of two or more fingers. Furthermore, either a contact type sensor or a contactless type sensor may be used as the fingertip information acquisition unit 108. When normalizing a positional relationship that is to be described below, using a combination of neighboring fingers is desirable to ensure that positional deviation does not occur. Therefore, in the present embodiment, the fingertip information acquisition unit 108 acquires the fingerprint images of the index finger, middle finger and ring finger.

The palm information acquisition unit 109 may be implemented with, for example, a complementary metal-oxide-semiconductor (CMOS) camera, and acquires the palm image. In the present embodiment, the palm information acquisition unit 109 acquires a palm image that includes a portion capable of determining the direction of a finger. The palm image may be, for example, a vein image, a palm shape image, or a palm print image. By using near-infrared light the palm information acquisition unit 109 may include the vein image in the palm image.

Meanwhile, it is desirable that the fingertip information acquisition unit 108 and the palm information acquisition unit 109 are disposed to both be fixed in order to stably extract biometric information. In addition, it is desirable to acquire the fingertip biometric information and palm biometric information at the same time. For example, it may be desirable to fix the fingertip information acquisition unit 108 and the palm information acquisition unit 109 within a given distance L so that a fingerprint image and a palm image can be simultaneously acquired. The distance L is, for example, about several cm to 10 cm, which may be fit within an average palm size.

The communication unit 106 is, for example, an interface to be coupled to a local area network (LAN). The identification information acquiring unit 107 is an input device, such as, for example, a keyboard or a mouse. The biometric information processing apparatus 100 communicates and exchanges information with an authentication server 200 and a database server 300 over a network via the communication unit 106. The authentication server 200 includes, for example, a CPU 201, a RAM 202, a storage device 203, and a communication unit 204. The storage device 203 stores a matching program. The database server 300 includes, for example, a storage device 301, and a communication unit 302.

A biometric information processing program stored in the storage device 103 of the biometric information processing apparatus 100 is deployed to be executable in the RAM 102. The CPU 101 executes the biometric information processing program deployed in the RAM 102. Accordingly, the respective processes to be performed by the biometric information processing apparatus 100 are executed. Through the execution of the biometric information processing program, a biometric data registration process and a biometric authentication process are performed. The biometric data registration process is a process in which identification information, a quality score, authentication features and relative features (hereinafter, collectively "registration data") of an unregistered new user (hereinafter, "a user to be registered") are registered in a database as data for a matching process for personal authentication. Biometric authentication is a process in which a user to be authenticated is specified by personal authentication based on matching of the identification information, the quality score, authentication features and relative features that are acquired during the authentication (hereinafter, collectively "input data") with the registration data. In the present embodiment, both authentication features and relative features are used during the biometric authentication process so that erroneous authentication is suppressed while suppressing the lengthening of the time required for authentication.

Figure 2:
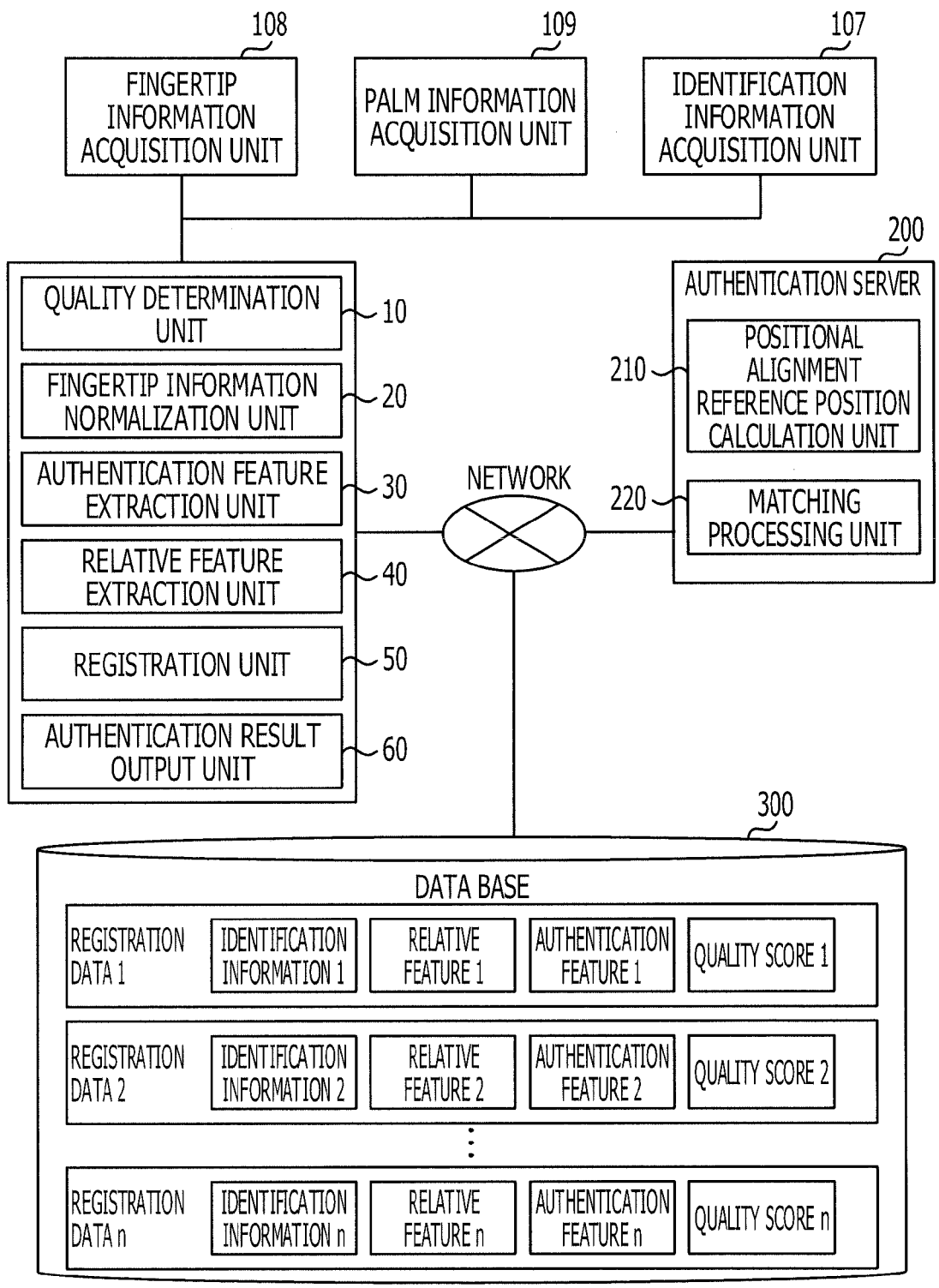
FIG. 2 is a block diagram of each function implemented by the execution of a biometric information processing program.

FIG. 2 illustrates a block diagram of each function implemented by the execution of a biometric information processing program. A quality determination unit 10, a fingertip information normalization unit 20, an authentication feature extraction unit 30, a relative feature extraction unit 40, a registration unit 50 and an authentication result output unit 60 are implemented by the execution of the biometric information processing program. The positional alignment reference position calculation unit 210 and a matching processing unit 220 are implemented by the execution of the matching program stored in the storage device 203.

(Biometric Data Registration Process)

Figure 3:
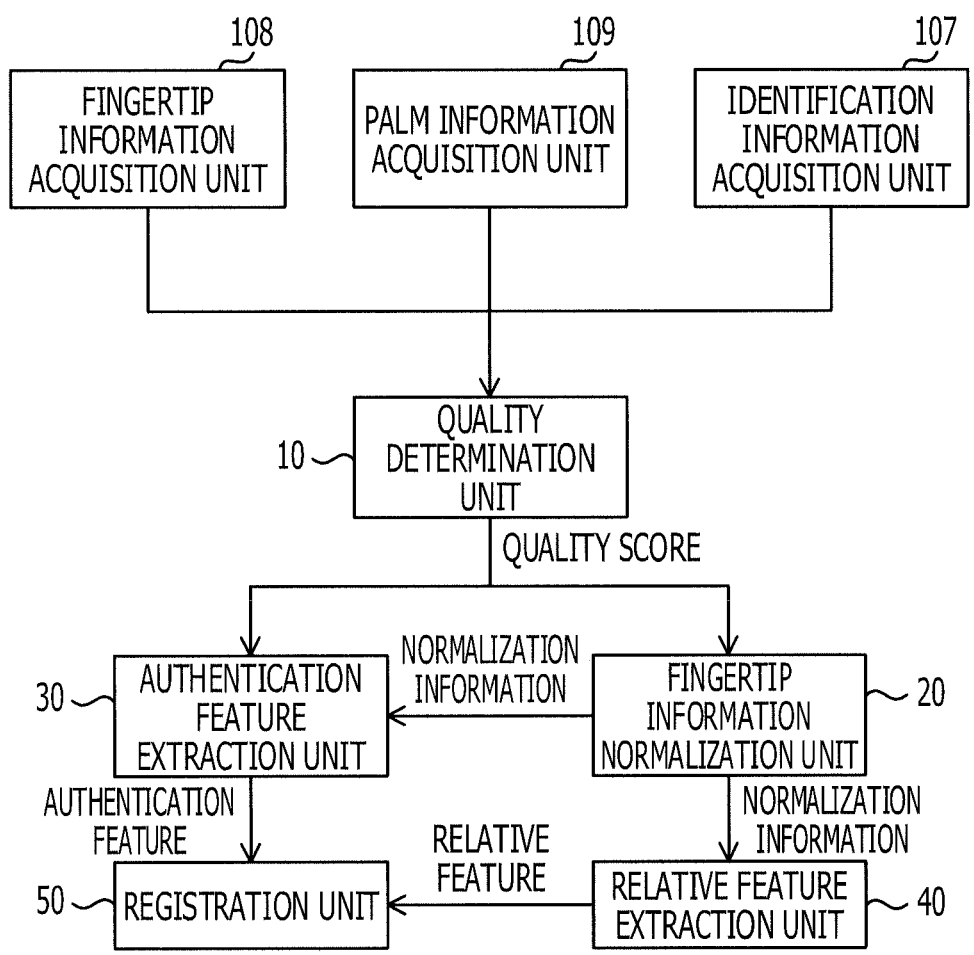
FIG. 3 is a block diagram of each function implemented during a biometric data registration process.
Figure 4:
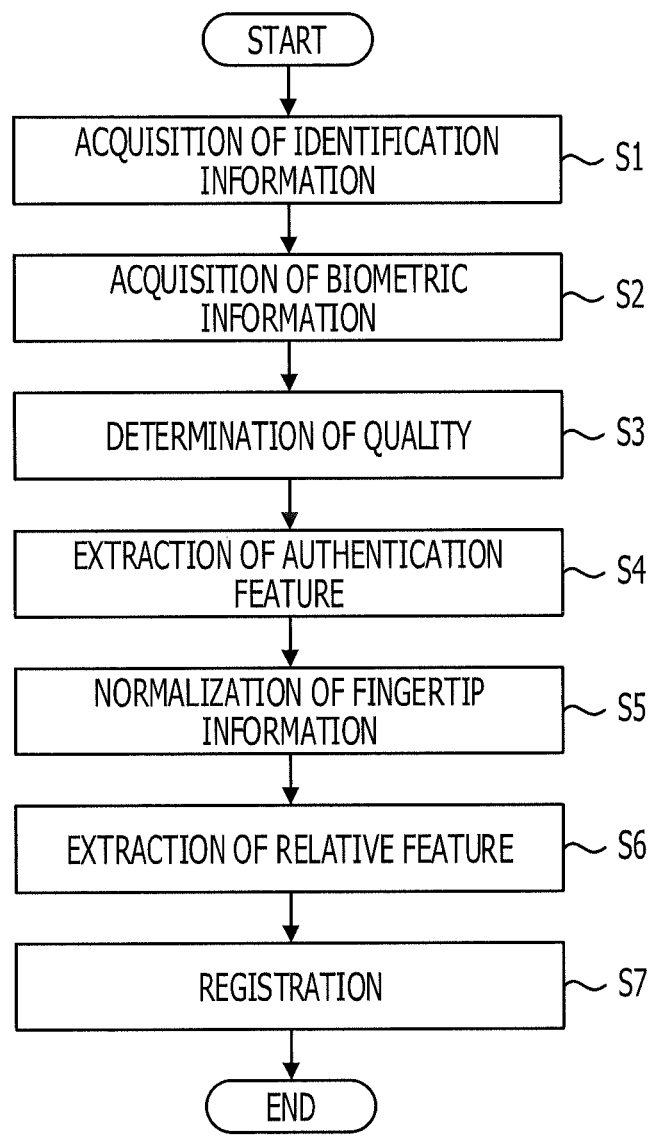
FIG. 4 is a view for describing an example of a flowchart executed during a biometric data registration process.

FIG. 3 illustrates a block diagram of each function implemented during a biometric data registration process. FIG. 4 is a view for describing an example of a flowchart executed during the biometric data registration process. Hereinafter, an example of the biometric data registration process will be described with reference to FIGS. 3 and 4.

The identification information acquiring unit 107 acquires identification information that is input by the user to be registered (S1). The identification information is information that specifies the user and is, for example, a name, a nickname, or an ID of the user. Subsequently, the biometric sensor 105 acquires the biometric information of the user to be registered (S2). Specifically, the fingertip information acquisition unit 108 acquires the fingerprint images of the index finger, middle finger and ring finger, and the palm information acquisition unit 109 acquires palm images that include the position of the base of each finger.

Subsequently, the quality determination unit 10 calculates the quality score using at least a portion of the images acquired by the fingertip information acquisition unit 108 and the palm information acquisition unit 109 (S3). A high quality score implies a good state of the biometric characteristic of the body. In the present embodiment, the quality determination unit 10 calculates the quality score based on the fingerprint images acquired by the fingertip information acquisition unit 108. In this case, the calculated quality score may be, for example, a value which is inversely proportional to the amount of correction in the direction of the ridges. In the meantime, the amount of correction in the direction of the ridges has a property indicating that if the value is large, the direction of the ridges becomes scattered and the state of the finger image is poor.

Subsequently, the authentication feature extraction unit 30 extracts an authentication feature used in the matching process from the fingerprint image (S4). The authentication feature that can be extracted from the fingerprint image is, for example, a ridge pattern of the fingerprint, or a positional relationship between minutiae of the fingerprint. When finger veins are used as the biometric feature of the fingertip, the authentication feature may be, for example, the pattern of the finger veins. Furthermore, the authentication feature extraction unit 30 may extract information used in the matching process based on the palm image as a portion of the authentication features in order to improve the discrimination accuracy of the authentication feature. The authentication feature that may be extracted from the palm image is, for example, the pattern of the palm veins.

The fingertip information normalization unit 20 normalizes by moving the fingerprint images of several fingers to a given position (S5). The fingertip information normalization unit 20 normalizes the plurality of the fingerprint images of the finger to a given positional relationship so that the variation of input position of the finger image may be corrected. Accordingly, information may be extracted without being influenced by variation.

Figure 5:
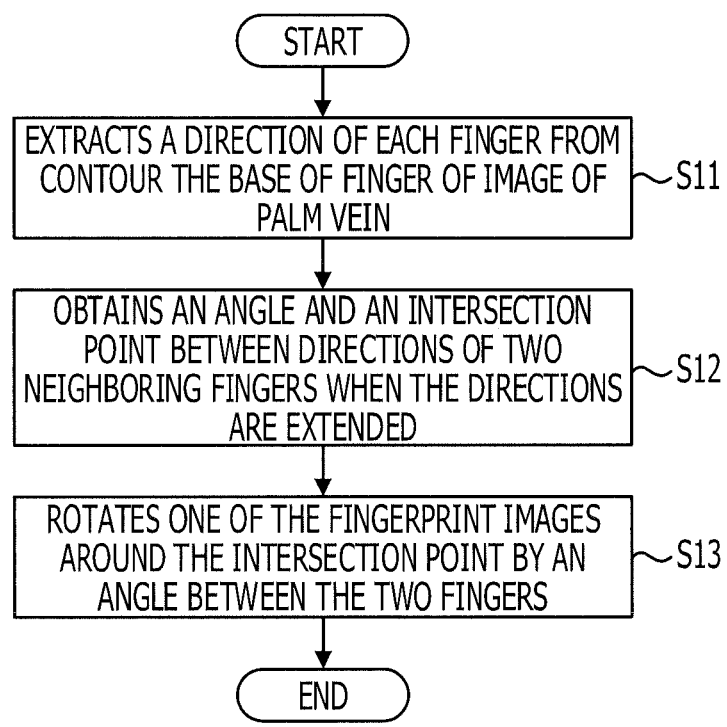
FIG. 5 is a view illustrating an example of a flowchart representing a normalization process.
Figure 6:
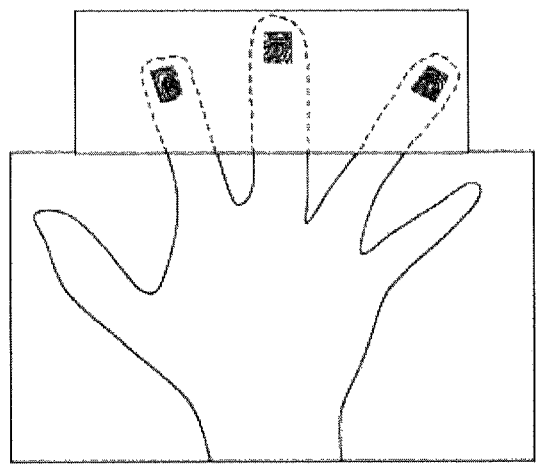
FIG. 6 is a view illustrating an example of a palm image.
Figure 7:
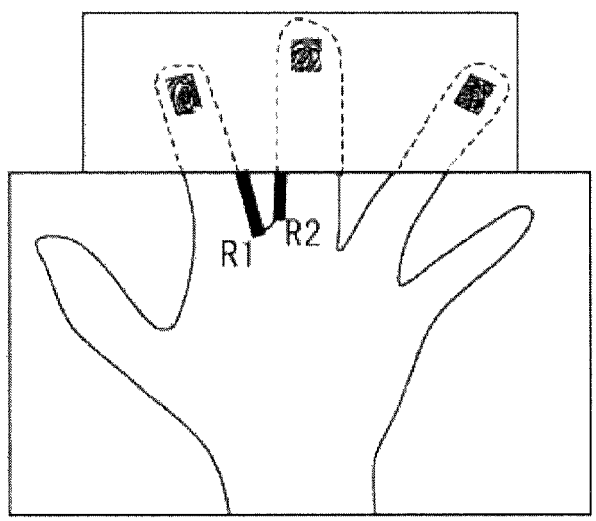
FIG. 7 is a view illustrating another example of a palm image.
Figure 8:
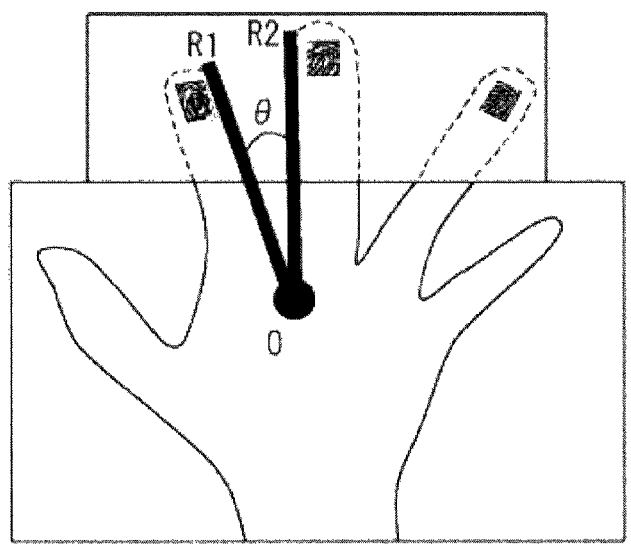
FIG. 8 is a view illustrating yet another example of a palm image.
Figure 9:
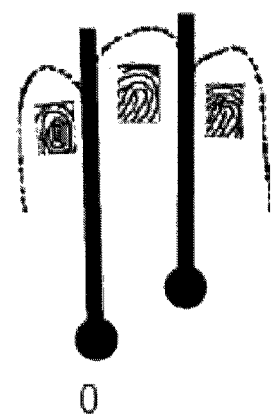
FIG. 9 is a view illustrating still yet another example of a palm image.

The fingertip information normalization unit 20 performs normalization, for example, by following the flow as illustrated in FIG. 5. First, the fingertip information normalization unit 20 extracts a straight line corresponding to the direction of each finger based on the outline of the vicinity of the base of each finger among the palm image as illustrated in FIG. 6 (S11). Specifically, the fingertip information normalization unit 20 defines straight lines representing the directions of two neighboring fingers as straight lines R1 and R2, as illustrated by the black bold lines in FIG. 7. Subsequently, the fingertip information normalization unit 20 extends the two straight lines R1 and R2, respectively, to obtain an angle θ and an intersection point O between the two straight lines R1 and R2, as illustrated in FIG. 8 (S12). Subsequently, the fingertip information normalization unit 20 rotates one of the fingerprint images around the intersection point O by the angle θ, as illustrated in FIG. 9 (S13). The fingertip information normalization unit 20 determines the positional relationship between the fingerprint images obtained by the rotation as a fingerprint image after normalization.

In the meantime, since the normalization process aims to standardize the relative positions between different fingerprint images, the straight lines R1 and R2 do not need to be parallel with each other. For example, the fingertip information normalization unit 20 may perform normalization by rotating the fingerprint image until the angle between the straight lines R1 and R2 becomes the most frequently input angle in order to reduce the frequency of the rotation process and optimize the normalization. Furthermore, rather than rotating the fingerprint image, the fingertip information normalization unit 20 may rotate either the position of minutiae or the position of the center of the finger extracted from the authentication feature extraction unit 30 in order to reduce the time required for the rotation process.

Referring back to FIG. 4 again, the relative feature extraction unit 40 extracts the relative feature from the fingerprint image after normalization (S6). As for the coordinate system for the relative features in the present embodiment, the relative feature extraction unit 40 uses a Cartesian coordinate system in which the position of the center of the fingerprint is set as the origin and the direction of the middle finger is set as an axis. Furthermore, as for the relative features, only minutiae located within a given range from the origin may perhaps be used in order to shorten the time required for processing without using all the minutiae in the fingerprint image. Furthermore, as for the origin of the relative features, the positions of the center of the fingerprint of several fingers may be used to calculate the coordinate values of the minutiae points based on the position of the center of each fingerprint. The center of the fingerprint indicates the flow of a semicircular shape included in the fingerprint, and may also be called a core. In a fingerprint having a whorl pattern, the central point of the whorl is the center of the fingerprint. As a method for calculating the center of the fingerprint, for example, the technical contents disclosed in Japanese Patent Publication No. 2790689 may be used.

Figure 10A:
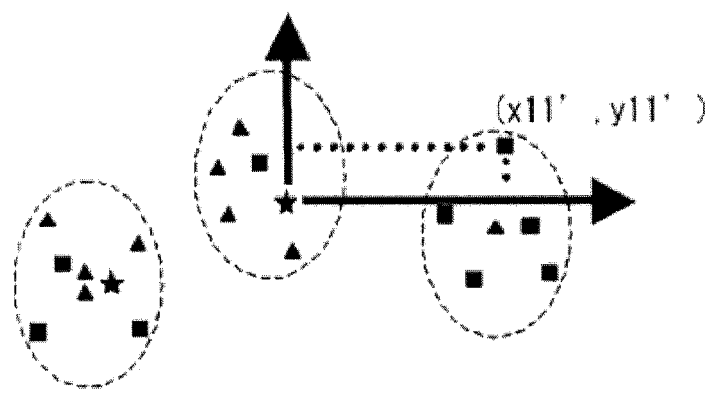
FIGS. 10A and 10B are views illustrating an example of a coordinate system when the position of a center of a fingerprint is used as the origin.
Figure 10B:
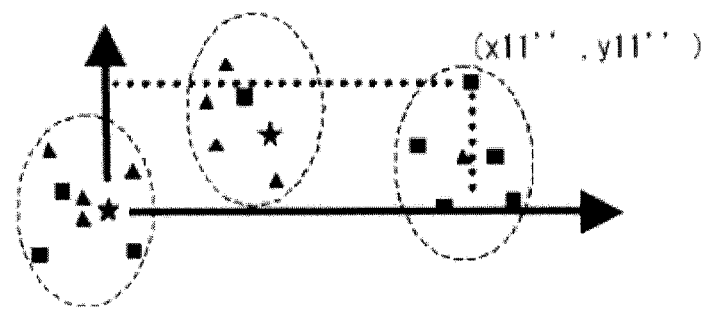

An example of a coordinate system in which the positions of the centers of the fingerprint of several fingers are set as the origins is illustrated in FIGS. 10A and 10B. Coordinate values are calculated based on plural positions of the centers of the fingerprint in order to extract the relative feature even when the acquisition of the position of the center of the fingerprint of any one finger fails and so that the relative feature may be extracted stably. FIG. 11 illustrates an example of a data structure for the relative features calculated using the position of the center of the fingerprint of each of the index finger, middle finger and ring finger as the origin.

The registration unit 50 registers the acquired identification information, the quality score, the relative features and the authentication features to a database of the database server 300 as registration data, as illustrated in FIG. 2 (S7). Referring to FIG. 2, the registration data is associated with each user and then registered. The biometric data registration process is then ended by completing S7.

[Biometric Authentication Process]

Figure 12:
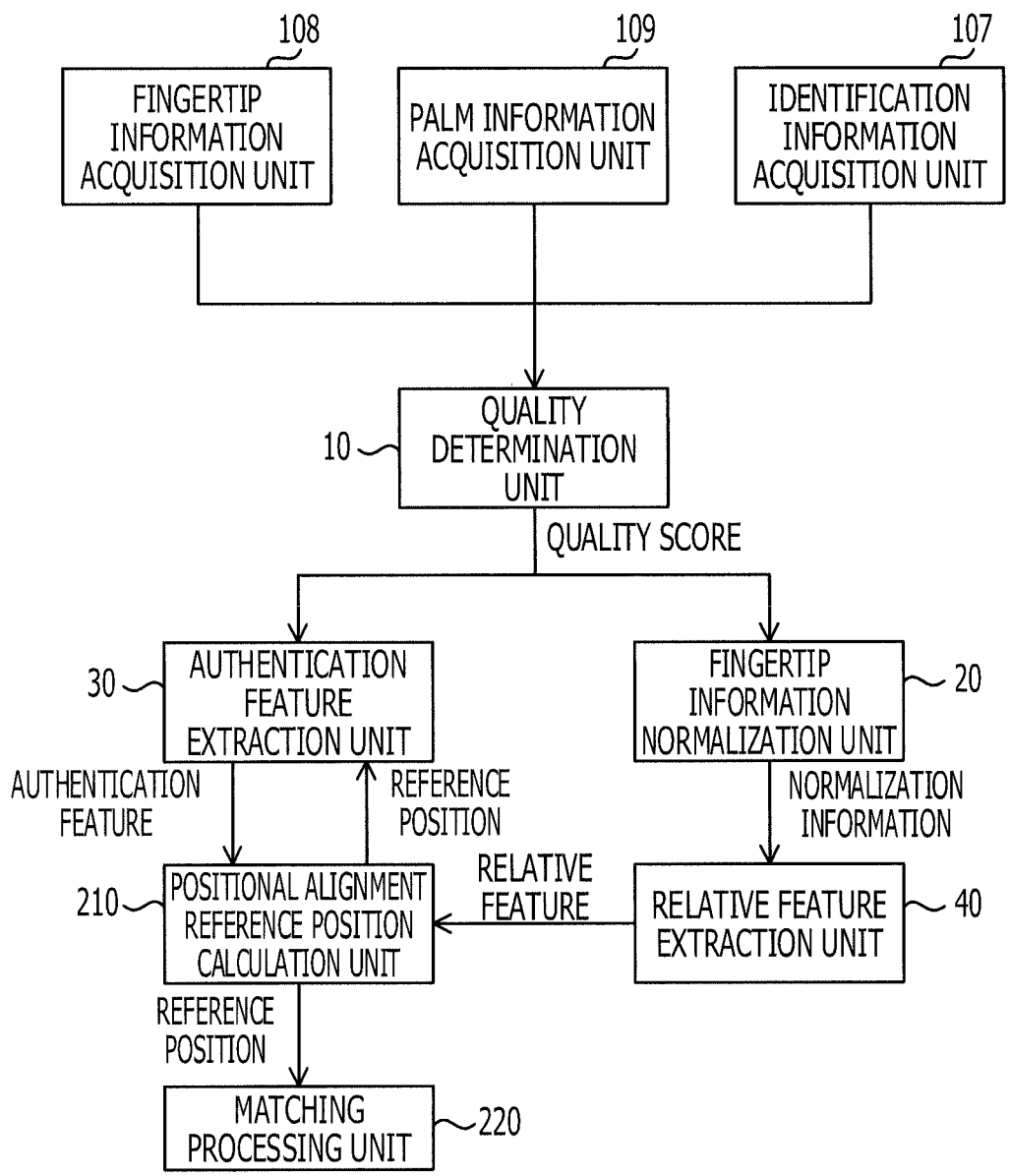
FIG. 12 is a block diagram of each function implemented during a biometric authentication process.
Figure 13:
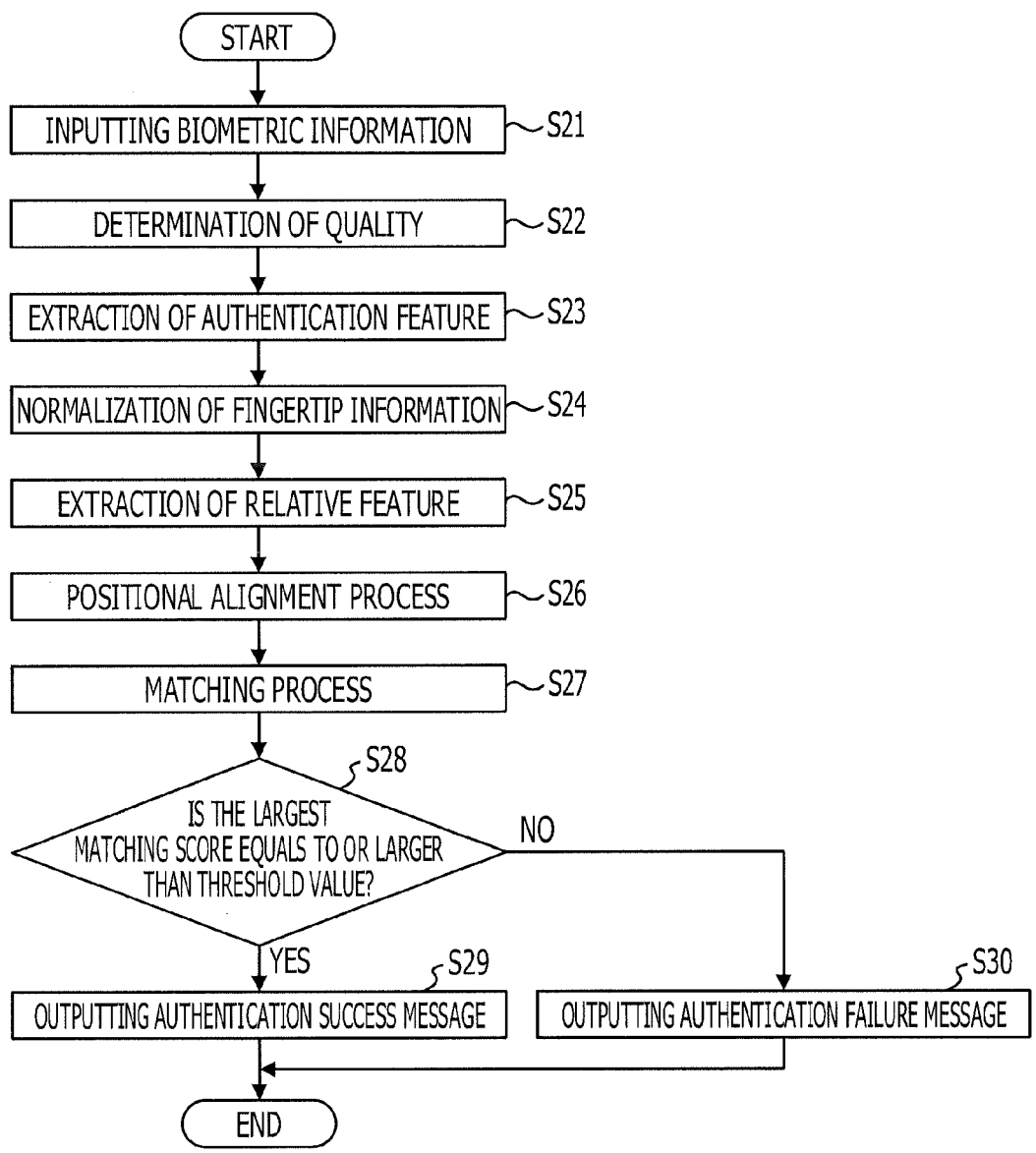
FIG. 13 is a view for describing an example of a flowchart executed during the biometric authentication process.

When a user who has been registered and is to be authenticated tries to login to a terminal equipped with, for example, the biometric information processing apparatus 100, the biometric information processing apparatus 100 performs a biometric authentication process. FIG. 12 illustrates a block diagram of each function implemented during the biometric authentication process. FIG. 13 is a view for describing an example of a flowchart executed during the biometric authentication process. An example of the biometric authentication process will be described hereinafter with reference to FIGS. 12 and 13.

The biometric sensor 105 acquires the biometric information of a user to be registered according to the same procedure as S2 of FIG. 4 (S21). Subsequently, the quality determination unit 10 performs a quality determination according to the same procedure as S3 of FIG. 4 (S22). Subsequently, the authentication feature extraction unit 30 extracts the authentication features used in the matching process based on the fingerprint images of several fingers according to the same procedure as S4 of FIG. 4 (S23). Subsequently, the fingertip information normalization unit 20 normalizes the fingertip images by moving the fingerprint images of several fingers to a given position according to the same procedure as S5 of FIG. 4 (S24). The relative feature extraction unit 40 extracts the relative features based on the images of the fingerprints after normalization according to the same procedure as S6 of FIG. 4 (S25). The input data acquired in S21 to S25 is sent to the authentication server 200.

Subsequently, the positional alignment reference position calculation unit 210 of the authentication server 200 performs a positional alignment process (S26). The positional alignment process is a process that aligns the position of the authentication features of the registration data with the position of the authentication features of the input data. Authentication precision is improved by means of the positional alignment process. Furthermore, the positional alignment process may be performed by using relative features. Subsequently, the matching processing unit 220 performs matching of the input data with the registration data for each finger based on the result of the positional alignment process (S27). In this case, matching is a process in which the matching score between the authentication feature of the registration data and the authentication feature of the input data is calculated. A high matching score represents a high degree of similarity for the authentication features of the registration data and the authentication features of the input data.

Figure 14:
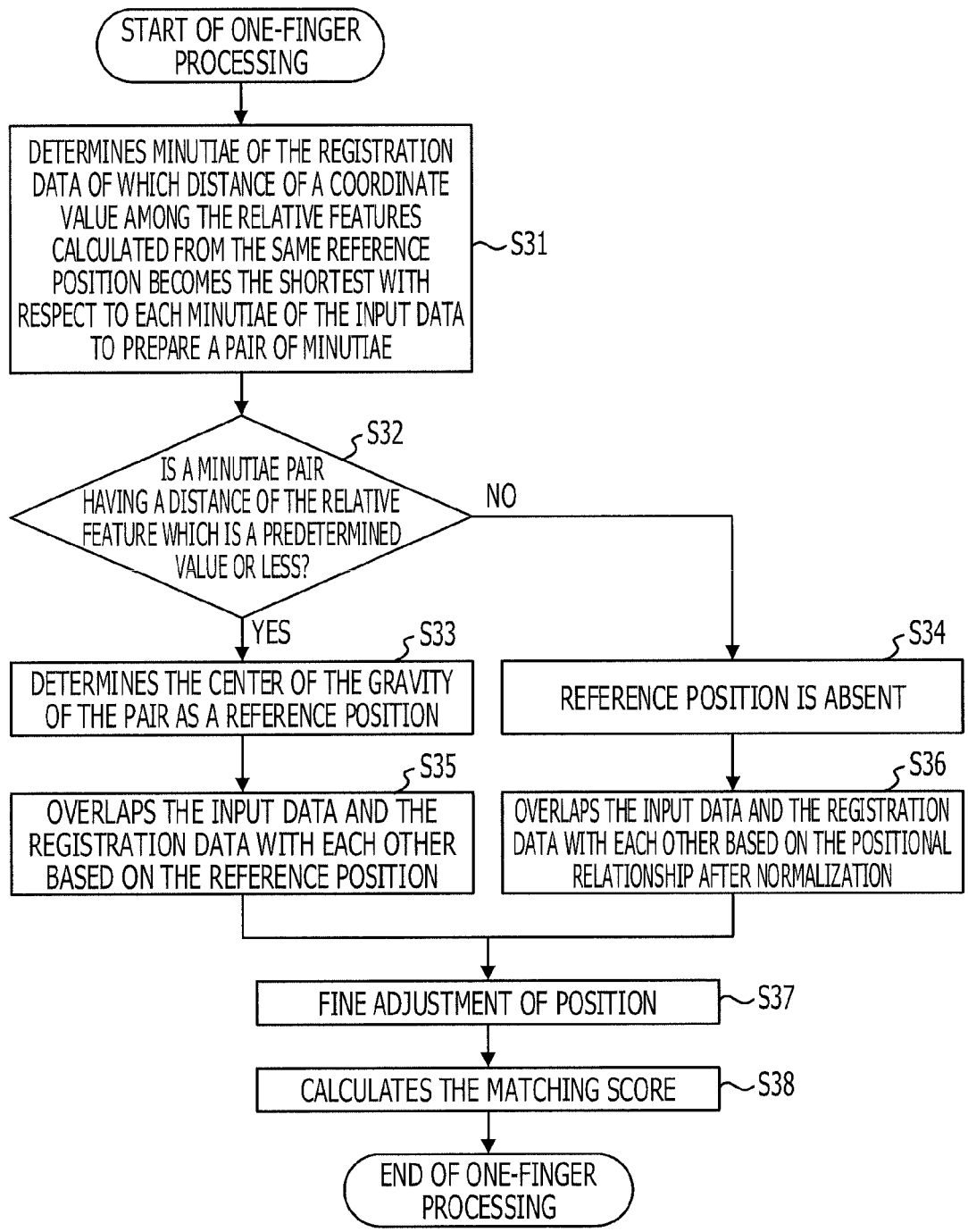
FIG. 14 is a flowchart for describing the details of a positional alignment process as in S26 and a matching process as in S27.

FIG. 14 is a flowchart for describing details of the positional alignment process of S26 and the matching process of S27. In the present embodiment, the processing of FIG. 14 is performed for each fingerprint image. Referring to FIG. 14, the positional alignment reference position calculation unit 210 first determines corresponding pairs of each minutiae of the input data and each minutiae of the registration data (S31). Specifically, the positional alignment reference position calculation unit 210 prepares pairs of each minutiae of the input data and each minutiae of the registration data so that the distance of a coordinate value among the relative features calculated from the same reference position becomes the shortest. The distance is, for example, Euclidean distance.

Subsequently, the positional alignment reference position calculation unit 210 determines whether there is a pair of which the distance of the relative feature is a given value or less among the pairs (S32). When the determination result is "Yes" at S32, the positional alignment reference position calculation unit 210 determines the center of the gravity of the pair as a reference position for positional alignment (S33). When there are a plurality of pairs of which the distance of the relative feature of each is a given value or less, the positional alignment reference position calculation unit 210 may calculate, for each of the input data and the registration data, the position of the center of the gravity of minutiae selected as the pair as the reference position. When the determination result at S32 is "No", the positional alignment reference position calculation unit 210 determines that the reference position for positional alignment is absent (S34).

In the meantime, the positional alignment reference position calculation unit 210 may perhaps determine the reference position by using only the value of the relative feature calculated based on the position of the center of the fingerprint of the fingerprint image of a finger of which the quality score of the input data is a given value or more. Alternatively, the positional alignment reference position calculation unit 210 may perhaps use only a value of the relative feature calculated based on the position of the center of the fingerprint of the fingerprint image of a finger of which the quality score is the highest among the three fingers of the input data. Furthermore, the positional alignment reference position calculation unit 210 may possibly use only a value of the relative feature calculated based on a position of the center of the fingerprint of the finger for which sum of the quality scores is a given value or more when comparing the quality scores of the same finger between the input data and the registration data. By using a stable reference position obtained using a fingerprint image having a good fingertip state, a stable positional alignment process may be performed without spending too much time, even for a fingerprint image that does not have a good fingertip state and does not have good detection precision for the reference position for positional alignment.

After S34, the matching processing unit 220 overlaps the input data and the registration data with each other based on the positional relationship after normalization obtained by the fingertip information normalization unit 20 (S36). For example, the matching processing unit 220 overlaps the input data and the registration data with each other according to a coordinate system based on the position of the center of the fingerprint of a finger.

Conversely, after S33, the matching processing unit 220 overlaps the input data and the registration data with each other by overlapping the reference positions obtained at S33 (S35). Using a reference position calculated by a plurality of corresponding minutiae positions, the input data and the registration data may be overlapped at a position having a smaller error than when the reference position is not used.

After performing either S35 or S36, the matching processing unit 220 performs positional alignment of the input data and the registration data (S37). Specifically, the matching processing unit 220 performs fine adjustment, such as rotation within a given angle α or movement within a given range S, with respect to the input data and the registration data overlapped with each other, so that the number of matching minutiae becomes the largest. Alternatively, the matching processing unit 220 may perform fine adjustment so that ridge patterns match each other as much as possible. For example, the α value is 10 (ten) degrees or less and the range of S is several square millimeters or less. Since the deviation of the reference position becomes small due to the normalization by the fingertip information normalization unit 20, the range for fine adjustment may be narrowed. The overall time required for the matching process may be shortened by narrowing the range of the fine adjustment.

Subsequently, the matching processing unit 220 calculates the matching score with respect to the authentication features of the input data and registration data after positional alignment (S38). The matching score is the degree of similarity of the authentication features. For example, using the authentication features, the matching processing unit 220 calculates the degree of similarity of the ridge patterns, or the degree of coincidence of the position or type of minutiae or the like as the matching score. In the meantime, since the processing of FIG. 4 is performed for each finger, the matching score of each finger is calculated.

Referring back to FIG. 13, the matching processing unit 220 determines whether the largest matching score is greater than or equal to a threshold (S28). When the determination result is "Yes" at S28, the authentication result output unit 60 receives the determination result and outputs a result indicating that authentication succeeded (S29). When the determination result is "No" at S28, the authentication result output unit 60 receives the determination result and outputs a result indicating that authentication failed (S30). After either S29 or S30 has been performed, the execution of flowchart of FIG. 13 ends.

According to the present embodiment, a relative feature having small positional deviation may be extracted by the normalization process. In this case, the search range for the positional alignment for the matching target may be narrowed. Accordingly, since the processing time required for positional alignment may be reduced, the overall matching time may be reduced as well. That is, according to the present embodiment, information that can shorten the time required for authentication may be extracted. In particular, the effect of the processing time reduction is substantial in one-to-N authentication where a matching of a user to be authenticated needs to be conducted with multiple registered users. Furthermore, even if the state of the body to be detected is poor, the influence of the poor state of the body may be reduced by using the relative feature of a body having a good state.

Modified Example

Figure 15:
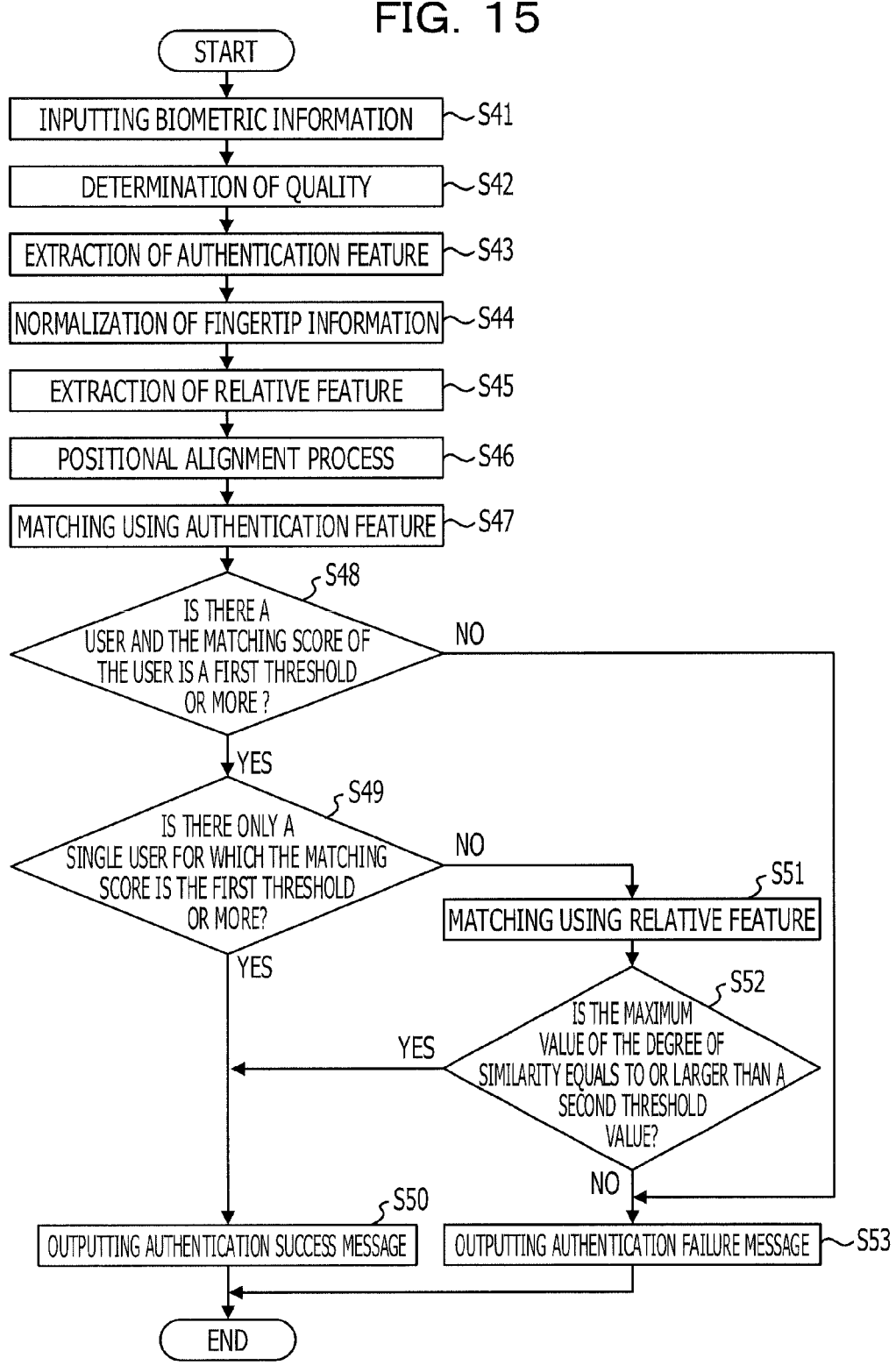
FIG. 15 is flowchart for describing another example of a biometric authentication process.

FIG. 15 illustrates a flowchart for describing another example of the biometric authentication process. S41 to S47 of FIG. 15 are the same as S21 to S27 of FIG. 13. After performing S47, the matching processing unit 220 determines whether there is a user whose matching score is a first threshold or more (S48). When the determination result is "Yes" at S48, the matching processing unit 220 determines whether there is only a single user for which the matching score is the first threshold or more (S49). When the determination result is "Yes" at step 49, the authentication result output unit 60 outputs a result indicating that authentication succeeded (S50). Subsequently, the execution of the flowchart of FIG. 15 ends. When the determination result is "No" at S48, the authentication result output unit 60 outputs a result indicating that authentication failed (S53). Subsequently, the execution of the flowchart of FIG. 15 ends.

When the determination result is "No" at S49, the matching processing unit 220 performs a matching process using the relative feature (S51). For example, when the relative feature is the positional relationship between minutiae, the matching processing unit 220 calculates a degree of similarity for the positional relationship between minutiae with respect to registration data that has a matching score greater than or equal to the first threshold value. The degree of similarity PS(Ti,I) between the registration data Ti and the input data I is calculated by the following equation 1.

$$PS(T_i, I) = \sum_{(x_j, y_j) \in R(I)} F(x_j, y_j, T_i) \quad \text{[Equation 1]}$$

where $$F(x_j, y_j, T_i) = \begin{cases} \alpha & (\exists (x'_k, y'_k) \in T_i \text{ s.t. } d(x_j, y_j, x'_k, y'_k) < \delta) \\ -\beta & (\text{otherwise}) \end{cases}$$

$$d(x_j, y_j, x'_k, y'_k) = \sqrt{(x_j - x'_k)^2 + (y_j - y'_k)^2}$$

Ti represents registration data, I represents input data, PS(Ti,I) represents the degree of similarity between the registration data Ti and the input data I, and R(I) represents the relative feature of the input data. In addition α>0, β>0, δ>0.

The matching processing unit 220 determines whether the maximum value of the degree of similarity calculated from the equation 1 is greater than or equal to a second threshold value (S52). When the determination result is "Yes" at S52, the authentication result output unit 60 performs S50. When the determination result is "No" at S52, the authentication result output unit 60 performs S53.

When there are several users having a matching score that is greater than or equal to the first threshold value, the possibility of erroneous authentication becomes more likely. However, erroneous authentication may be suppressed by performing a second determination using the relative feature. With one-to-one authentication that presupposes the matching of a single user to be authenticated and a single registered user, when the matching score is both greater than or equal to the first threshold value and less than a third threshold value, the matching processing unit 220 may calculate the degree of similarity according to equation 1 by using the relative feature. When the matching score is greater than or equal to the third threshold value, or when the matching score is greater than or equal to the first threshold value and the degree of similarity is greater than or equal to the second threshold value, the matching processing unit 220 calculates an authentication result indicating that authentication succeeded. When the matching score is less than the third threshold value but is greater than or equal to the first threshold value, this may be an exceedingly rare case of where the registration data used to match the user is the registration data of another user. In this case, the matching processing unit 220 may perform a second determination by using the relative features as well to suppress erroneous authentication.

Second Embodiment

Figure 16:
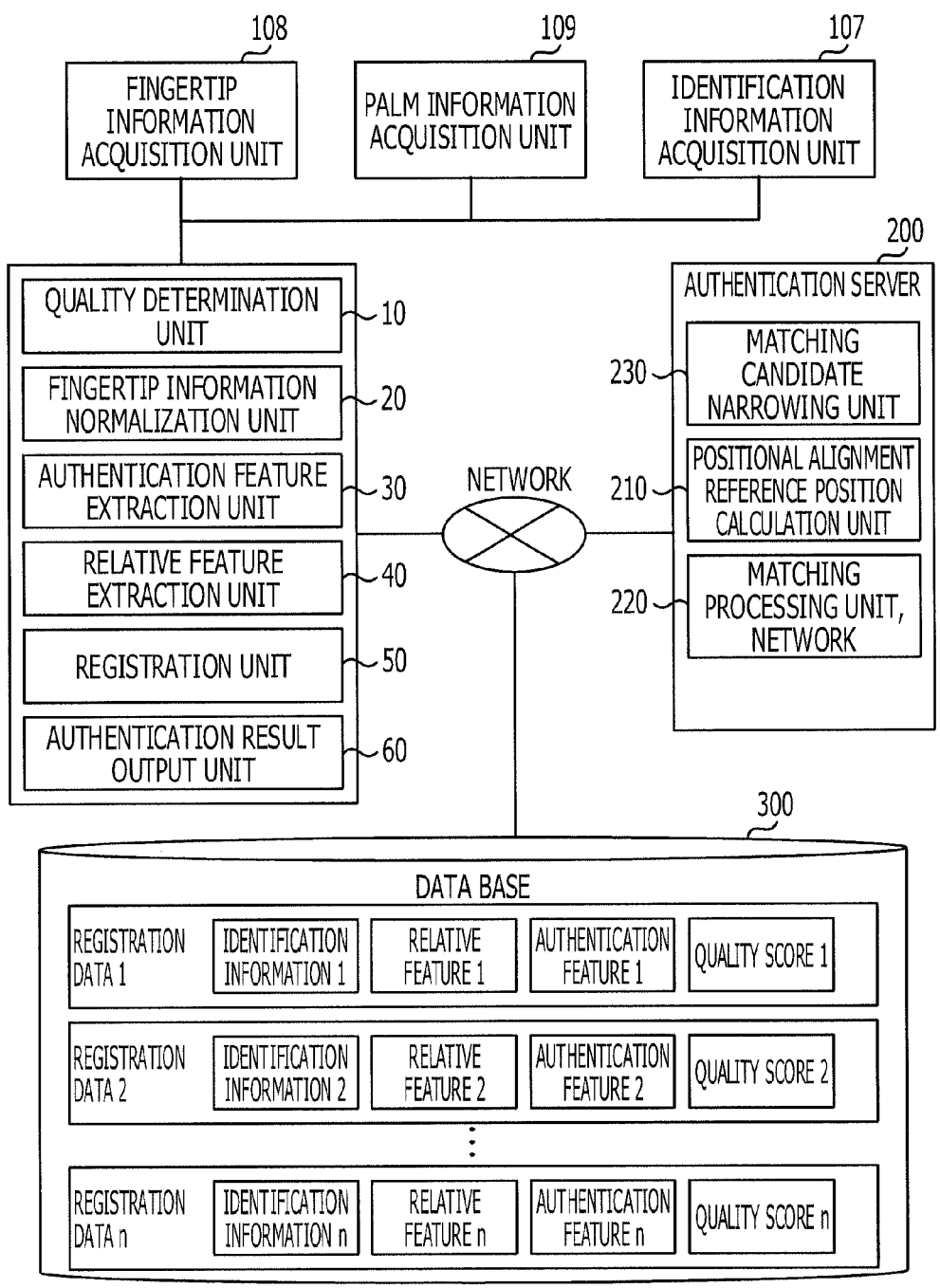
FIG. 16 is another block diagram of each function implemented by the execution of the biometric information processing program.
Figure 17:
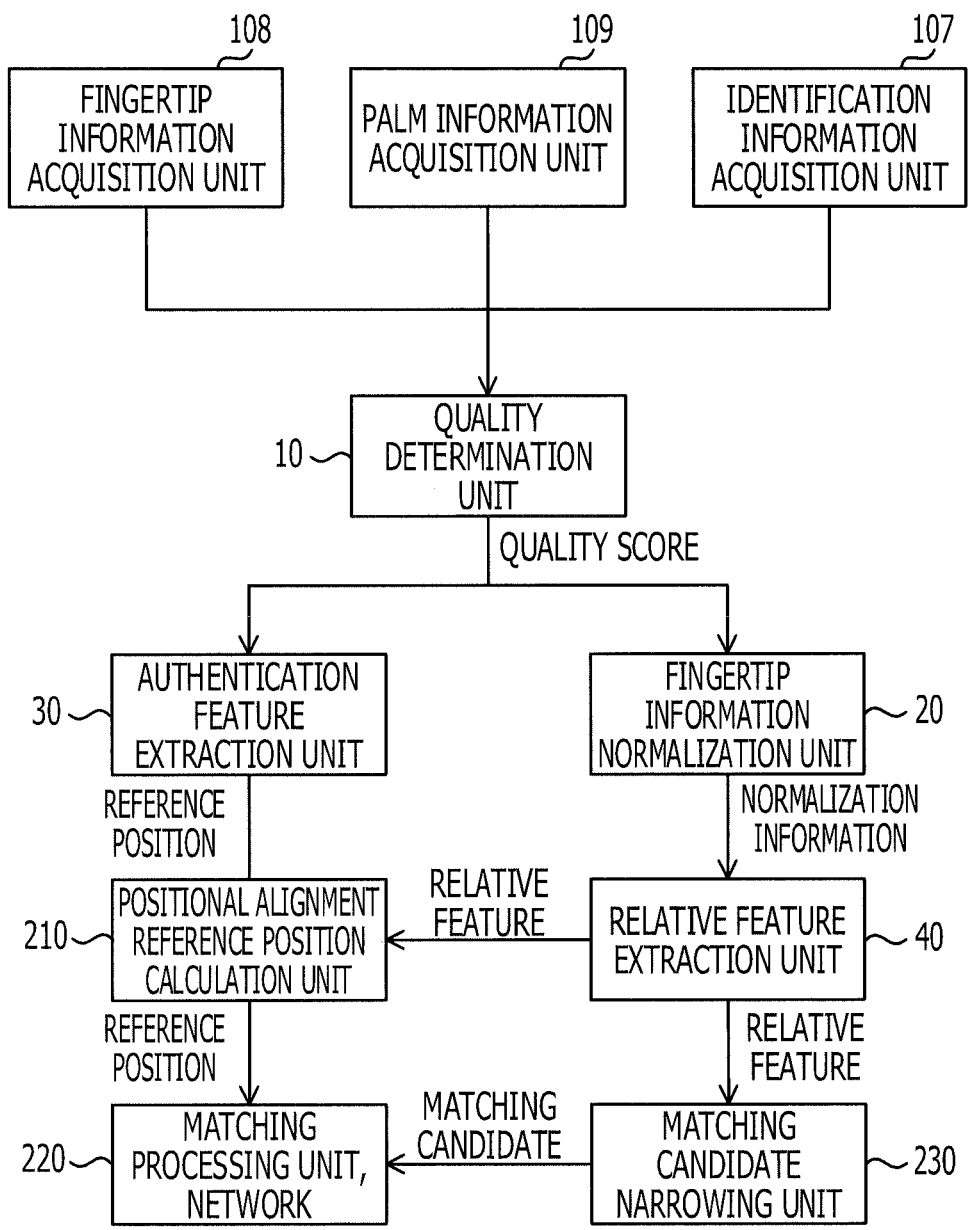
FIG. 17 is another block diagram of each function implemented during the biometric authentication process.
Figure 18:
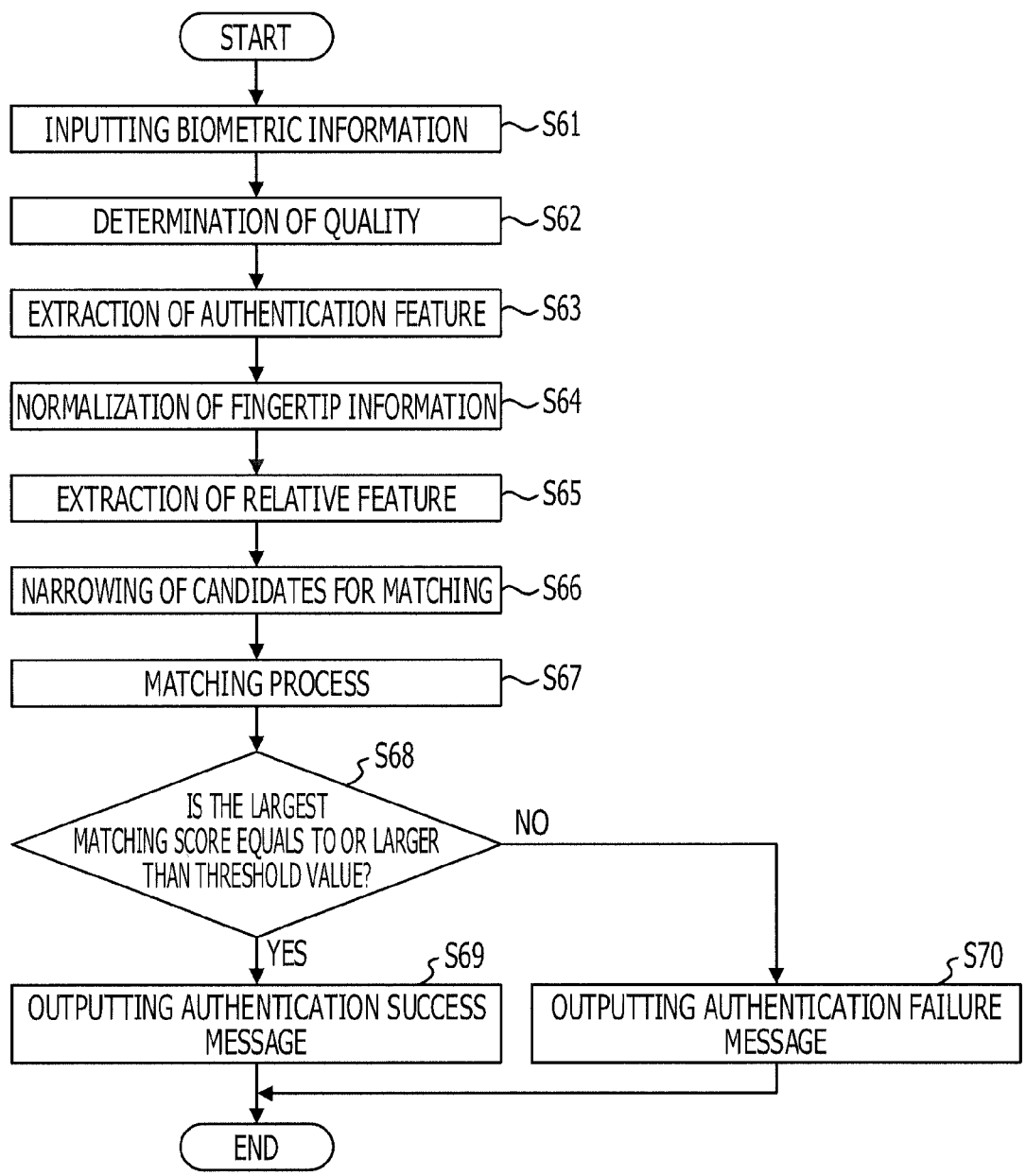
FIG. 18 is a view for describing another example of a flowchart executed during the biometric authentication process.

The candidates for matching may be narrowed during a matching process. For example, referring to FIG. 16, the positional alignment reference position calculation unit 210, the matching processing unit 220, and a candidate for matching narrowing unit 230 may be implemented by executing the matching program stored in the storage device 203 of the authentication server 200. FIG. 17 is a block diagram of each function implemented during the biometric authentication process. FIG. 18 is a view for describing an example of a flowchart executed during the biometric authentication process. Below, an example of the biometric authentication process will be described with reference to FIGS. 17 and 18.

S61 to S65 of FIG. 18 are the same as S21 to S25 of FIG. 13. Furthermore, S68 to S70 of FIG. 18 are the same as S28 to S30 of FIG. 13.

After performing S65, the matching candidate narrowing unit 230 narrows the candidates for matching (S66). Specifically, the matching candidate narrowing unit 230 calculates a narrowed score in which, when comparing the relative feature of the registration data with the relative feature of the input data, the probability that the registration data and the input data correspond to data about the same person becomes higher as the narrowed score becomes higher. For example, the narrowed score is calculated from a value indicating whether the narrowed score, which corresponds to the positional relationship of minutiae among the relative features in the input data, is present in the positional relationship between minutiae among the relative features in the registration data. The narrowed score may be calculated according to equation 1. The matching candidate narrowing unit 230 determines registration data having a narrowed score that is greater than or equal to a given numerical value among registration data as the candidates for matching. Alternatively, the matching candidate narrowing unit 230 lists registration data in descending order of narrowed score and determines a given number of the registration data with higher rankings as the candidates for matching.

The matching processing unit 220 matches the input data against the registration data for the candidates for matching. That is, the matching processing unit 220 completes the matching process without matching all candidates for matching against the input data. Accordingly, the time required for matching may be reduced. In the meantime, through the normalization process of the fingertip information normalization unit 20, the relative feature becomes a stable amount of feature having a small deviation. Accordingly, the relative feature may be used in a narrowing process without performing positional alignment. Accordingly, the narrowing process may be performed within a shorter time than a process which requires positional alignment.

Other Embodiment

In each embodiment as described above, although one-to-N authentication is performed where matching of a user to be authenticated is performed against multiple registered users, one-to-one authentication may also be performed where the matching of a single user to be authenticated is performed against a single registered user. One-to-one authentication may be implemented by limiting the number of registered users for matching by using identification information acquired from the users to be authenticated during the biometric authentication process. Alternatively, when the registration data for only one person has been registered, one-to-one authentication may be implemented.

In the embodiment as described above, the biometric information processing apparatus 100, the authentication server 200, and the database server 300 are configured as separate apparatuses, but may be configured as, for example, a single server. In this case, the matching program may be included in the biometric information processing program. Furthermore, the positional alignment reference position calculation unit 210, the matching processing unit 220 and the matching candidate narrowing unit 230 may be implemented as functions within the biometric information processing apparatus 100.

Figure 19:
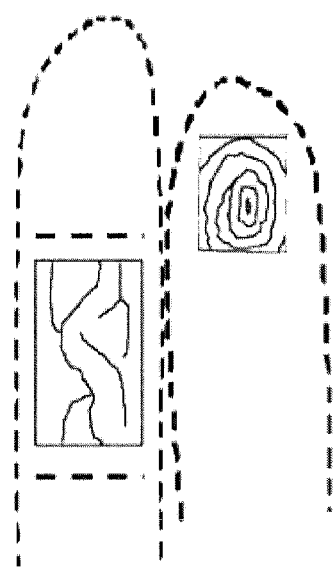
FIG. 19 is a view for describing another example of normalization.

Subjects to be normalized may possibly not have the same modality. For example, the vein image and the fingerprint image may be normalized. FIG. 19 is a view for describing another example of normalization. The example in FIG. 19 illustrates the normalization of the position of the finger veins of a middle finger and the position of the fingerprint image of a ring finger. Referring to FIG. 19, by using the processes of FIG. 5 to FIG. 9, one of the images is rotated so that the positional relationship between the finger images may be normalized. In this case, the fingertip information normalization unit 20 may set a coordinate system in which the origin is the center of the fingerprint and an axis is the direction of the fingertip in order to extract as relative features, for example, the pattern of the finger vein, the bifurcation point, and the endpoint of the finger vein.

Figure 20:
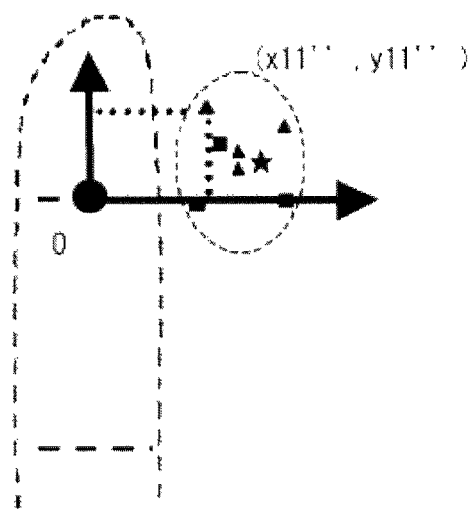
FIG. 20 is a view for describing an example of normalization using the first joint of a finger.

Alternatively, when the first joint of a finger is present in the image, the fingertip information normalization unit 20 may use the first joint. FIG. 20 is a view for describing an example of normalization using the first joint. Referring to FIG. 20, the fingertip information normalization unit 20 may set a coordinate system in which, in order to extract finger veins, the origin is the center of the first joint of a finger and an axis is the first joint, in order to extract the coordinates of minutiae of fingerprint of the ring finger as the relative feature.

Figure 21:
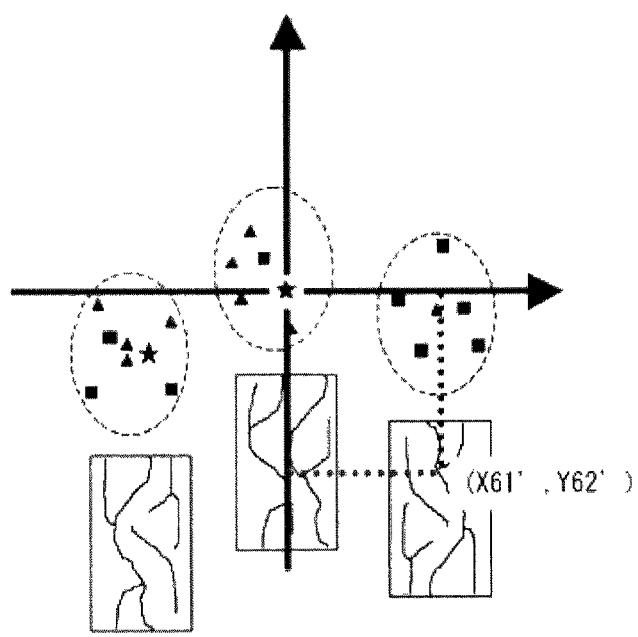
FIG. 21 is a view illustrating an example in which a relative feature is extracted based on both the veins and fingerprint of each finger.

Furthermore, both the veins and the fingerprint of each finger may be used. FIGS. 21 and 22 illustrate an example in which relative features are extracted from both the veins and the fingerprint of each finger. For example, the fingertip information normalization unit 20 may extract the pattern of the finger veins, the bifurcation point and the endpoint of the finger veins to use these information as the relative features along with the relative feature of the fingerprint in the coordinate system which is based on the position of the center of the fingerprint.

Figure 23:
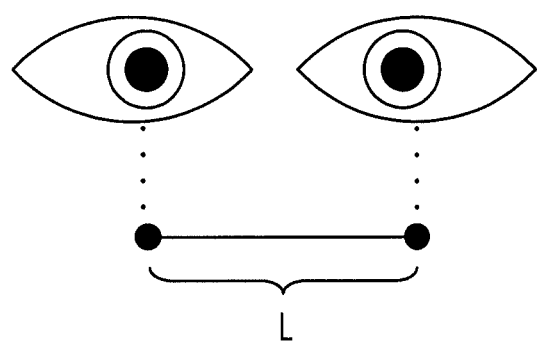
FIG. 23 is a view for describing an example of normalization using the iris and the face.

In each embodiment as described above, the finger and the palm are used as different instances, but other instances may also be used. FIG. 23 illustrates an example in which the iris and the face are used as instances. Referring to FIG. 23, iris images of both eyes are acquired. Subsequently, the iris images of both eyes are normalized by correcting the face image to a frontal face image. In the meantime, the iris images of both eyes may be further normalized so that the line segment connecting the centers of both eyes becomes horizontal. During the biometric data registration process, authentication features may be extracted from the normalized images. Furthermore, the length L of the line segment may be used as a relative feature. During the authentication process, the iris image of the input data may be expanded or contracted so that the length of the relative feature of the registration data becomes the same as the length of the relative feature of the input data. A matching process may be performed based on the iris by extracting the authentication feature from the acquired iris image. In this case, rectification may be made even if the scale or gradient of the iris image varies when the distance between the face and the camera are different or the gradient of the face is different during the registration process and during the authentication process.

A recording medium storing a software program for implementing the function of the biometric information processing apparatus 100 may be provided in the biometric information processing apparatus 100 and the CPU 101 may execute the software program. The recording medium for providing the program includes, for example, a CD-ROM, a DVD, a Blue-ray Disc, or a SD card. Furthermore, in each embodiment as described above, the respective functions are implemented by the execution of the program by the CPU, but each embodiment is not limited thereto. For example, the respective functions may be implemented by using, for example, a dedicated circuit.

As described above, the embodiments according to the present disclosure has been described in detail, but the present disclosure is not limited to a specific embodiment, and various alterations and changes may be made without departing from the gist of the exemplary embodiments of the present disclosure.

According to a biometric information processing apparatus, a biometric information processing method and a recording medium thereof storing a biometric information processing program disclosed in the present disclosure, information capable of shortening the time required for an authentication process may be extracted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A biometric information processing apparatus, comprising:
    a biometric sensor configured to acquire biometric information of a first instance, a second instance and a third instance;
    a processor configured to execute a process, the process comprising:
    extracting an authentication feature used for matching from the biometric information of each of the second instance and the third instance;
    normalizing relative positions of authentication features of the second instance and the third instance by using the biometric information of the first instance;
    extracting a relative feature indicating a relative positional relationship between the authentication features of the second instance and the third instance after the relative positions of the authentication features of the second instance and the third instance have been normalized;
    narrowing out a matching candidate from a plurality of users registered in a database by matching relative features of the plurality of users with the extracted relative feature; and
    authenticating a user according to a result of matching the authentication feature and the relative feature for the matching candidate narrowed in the narrowing, among the authentication features and the relative features of the plurality of users registered in the database, with the authentication feature extracted in the extracting of the authentication feature and the relative feature extracted in the extracting of the relative feature.

2. The biometric information processing apparatus according to claim 1, wherein the processor configured to execute the process further including:
    acquiring identification information input by a user,
    wherein the authenticating procedure including specifying the relative feature and the authentication feature in association with the identification information in the database to authenticate a user according to a result of matching of the specified relative feature and authentication feature with the relative feature extracted in the extracting procedure of the relative feature and the authentication feature extracted in the extracting procedure of the authentication feature.

3. The biometric information processing apparatus according to claim 1, wherein the processor configured to execute the process further including:
    calculating a reference position for positional alignment between the authentication feature registered with the database and the authentication feature extracted in the extracting of the authentication feature using the relative feature,
    wherein the authenticating includes performing the positional alignment between the authentication feature registered with the database and the authentication feature extracted in the extracting of the authentication feature using the reference position.

4. The biometric information processing apparatus according to claim 1, wherein the authenticating process includes incorporating into a matching result a degree of similarity between the relative features registered with the database and the relative feature extracted in the extracting of the relative feature.

5. The biometric information processing apparatus according to claim 1, wherein the second instance and the third instance are different fingers and the first instance is a palm.

6. The biometric information processing apparatus according to claim 5, wherein the normalizing includes normalizing a direction along which the different fingers extend based on the direction of the base of each finger of the palm.

7. The biometric information processing apparatus according to claim 6, wherein the biometric information of the second instance and the third instance are fingerprint images of several fingers, and the relative feature is a relative position between a center of fingerprint of one finger and minutiae of the other finger.

8. The biometric information processing apparatus according to claim 1, wherein the biometric sensor further acquires biometric information of a fourth instance, and wherein
    the extracting of the authentication feature includes extracting an authentication feature for matching from the biometric information of the fourth instance, and
    the normalizing includes normalizing a relative position between the authentication features of second instance, the third instance and the fourth instance using the biometric information of the first instance, and
    the extracting of the relative feature includes extracting a relative feature indicating a relative positional relationship between the authentication features of the second instance, the third instance and the fourth instance normalized in the normalizing, and
    wherein the processor configured to execute the process further including:
    determining quality scores of the biometric information of the second instance, the third instance and the fourth instance, and wherein the authenticating does not use a relative feature calculated based on an instance of which the quality score obtained in the procedure is a given value or less.

9. A biometric information processing method, comprising:
acquiring biometric information of a first instance, a second instance and a third instance;
extracting an authentication feature for matching from the biometric information of each of the second instance and the third instance;
normalizing a relative position between authentication features of the second instance and the third instance by using the biometric information of the first instance;
extracting a relative feature indicating a relative positional relationship between the authentication features of the second instance and the third instance normalized in the normalizing;
narrowing out a matching candidate from a plurality of users registered in a database by matching relative features of the plurality of users with the extracted relative feature; and
authenticating a user according to a result of matching the authentication feature and the relative feature for the matching candidate narrowed in the narrowing, among the authentication features and the relative features of the plurality of users registered in the database, with the authentication feature extracted in the extracting of the authentication feature and the relative feature extracted in the extracting of the relative feature.

10. The biometric information processing method according to claim 9, further comprising:
acquiring identification information input by a user,
wherein the authenticating includes specifying the relative feature and the authentication feature in association with the identification information in the database to authenticate a user according to a result of matching of the specified relative feature and authentication feature with the relative feature extracted in the extracting of the relative feature and the authentication feature extracted in the extracting of the authentication feature.

11. The biometric information processing method according to claim 9, further comprising:
calculating a reference position for positional alignment between the authentication feature registered with the database and the authentication feature extracted in the extracting of the authentication feature using the relative feature,
wherein the authenticating includes performing the positional alignment between the authentication feature registered with the database and the authentication feature extracted in the extracting of the authentication feature using the reference position.

12. The biometric information processing method according to claim 9, wherein the authenticating includes incorporating into a matching result a degree of similarity between the relative features registered with the database and the relative feature extracted in the extracting of the relative feature.

13. The biometric information processing method according to claim 9, wherein the second instance and the third instance are different fingers and the first instance is a palm.

14. The biometric information processing method according to claim 13, wherein the normalizing includes normalizing a direction along which the different fingers extend based on the direction of the base of each finger of the palm.

15. A non-transitory computer-readable recording medium storing a program causing a computer to execute a process, the process comprising:
acquiring biometric information of a first instance, a second instance and a third instance;
extracting an authentication feature used for matching from the biometric information of the second instance and the third instance;
normalizing a relative position of authentication features of the second instance and the third instance by using the biometric information of the first instance; and
extracting a relative feature indicating a relative positional relationship between the authentication features of the second instance and the third instance normalized in the normalizing;
narrowing out a matching candidate from a plurality of users registered in a database by matching relative features of the plurality of users with the extracted relative feature; and
authenticating a user according to a result of matching the authentication feature and the relative feature for the matching candidate narrowed in the narrowing, among the authentication features and the relative features of the plurality of users registered in the database, with the authentication feature extracted in the extracting of the authentication feature and the relative feature extracted in the extracting of the relative feature.

16. The non-transitory computer-readable recording medium according to claim 15, wherein the process further comprises:
acquiring identification information input by a user,
wherein the authenticating includes specifying the relative feature and the authentication feature in association with the identification information in the database to authenticate a user according to a result of matching of the specified relative feature and authentication feature with the relative feature extracted in the extracting of the relative feature and the authentication feature extracted in the extracting of the authentication feature.

17. The non-transitory computer-readable recording medium according to claim 15, wherein the process further comprises:
calculating a reference position for positional alignment between the authentication feature registered with the database and the authentication feature extracted in the extracting of the authentication feature using the relative feature,
wherein the authenticating includes performing the positional alignment between the authentication feature registered with the database and the authentication feature extracted in the extracting of the authentication feature using the reference position.

18. The non-transitory computer-readable recording medium according to claim 15, wherein the authenticating includes incorporating into a matching result a degree of similarity between the relative features registered with the database and the relative feature extracted in the extracting of the relative feature.

19. The non-transitory computer-readable recording medium according to claim 15, wherein the second instance and the third instance are different fingers and the first instance is a palm.

* * * * *